US009728922B2

(12) United States Patent
Carera et al.

(10) Patent No.: US 9,728,922 B2
(45) Date of Patent: Aug. 8, 2017

(54) ELECTRICAL ADAPTER, AND RELATED SWITCHGEAR PANEL

(71) Applicant: ABB Technology AG, Zurich (CH)

(72) Inventors: David Carera, Treviolo (IT); Carlo Gemme, Pavia (IT); Fabio Pellegrini, Bergamo (IT); Giorgio Moriconi, Torre Boldone (IT)

(73) Assignee: ABB Schweiz AG, Baden (CH)

( * ) Notice: Subject to any disclaimer, the term of this patent is extended or adjusted under 35 U.S.C. 154(b) by 184 days.

(21) Appl. No.: 14/560,390

(22) Filed: Dec. 4, 2014

(65) Prior Publication Data

US 2015/0087177 A1   Mar. 26, 2015

Related U.S. Application Data

(63) Continuation of application No. PCT/EP2013/059849, filed on May 13, 2013.

(30) Foreign Application Priority Data

Jun. 8, 2012 (EP) .................................. 12171297

(51) Int. Cl.
*H01R 31/00* (2006.01)
*H01R 31/06* (2006.01)
(Continued)

(52) U.S. Cl.
CPC ............. *H01R 31/06* (2013.01); *H01R 12/91* (2013.01); *H01R 13/59* (2013.01); *H02B 11/04* (2013.01)

(58) Field of Classification Search
CPC ........ H02B 11/04; H01R 31/06; H01R 12/91; H01R 13/59
(Continued)

(56) References Cited

U.S. PATENT DOCUMENTS

| 1,531,917 | A | * | 3/1925 | French | H01H 1/46 200/258 |
|---|---|---|---|---|---|
| 1,797,936 | A | | 3/1931 | Auringer | |
| 3,277,252 | A | * | 10/1966 | Beddoe | H02B 11/04 200/50.21 |
| 3,662,137 | A | | 5/1972 | Cleaveland | |
| 4,723,917 | A | | 2/1988 | Cournet et al. | |
| 4,818,822 | A | | 4/1989 | Yahraus | |
| 8,835,782 | B2 | * | 9/2014 | Fischer-Carne | H01H 9/52 200/279 |

(Continued)

FOREIGN PATENT DOCUMENTS

| EP | 0880208 A1 | 11/1998 |
|---|---|---|
| EP | 1962397 A1 | 8/2008 |

(Continued)

OTHER PUBLICATIONS

International Search Report (PCT/ISA/210) mailed on Jun. 28, 2013, by the European Patent Office as the International Searching Authority for International Application No. PCT/EP2013/059850.
(Continued)

*Primary Examiner* — Felix O Figueroa
(74) *Attorney, Agent, or Firm* — Taft Stettinius & Hollister LLP

(57) ABSTRACT

An electrical adapter is disclosed for connecting a connection contact of a circuit breaker with an associated contact piece of an electrical circuit along which the circuit breaker has to be inserted, including a hollow tubular element having a first end portion and a second end portion configured to be electrically connected to a connection contact and a contact piece, respectively, an inner cavity of the hollow tubular element having, at the first end portion, a first frusto-conical shape. A first connector having a hollow deformable body and configured to be accommodated inside the first end portion. A locking body configured to be securely placed along the inner cavity of the hollow tubular element. A second connector including a first connection portion configured to be accommodated inside the first end portion of the hollow tubular element.

20 Claims, 11 Drawing Sheets

(51) Int. Cl.
*H01R 12/91* (2011.01)
*H02B 11/04* (2006.01)
*H01R 13/59* (2006.01)

(58) Field of Classification Search
USPC ........ 200/50.17, 50.21–50.27; 439/246–248, 439/252, 638
See application file for complete search history.

(56) References Cited

U.S. PATENT DOCUMENTS 8,913,370 B2 * 12/2014 Smith .................. H05K 5/0217
200/50.22

FOREIGN PATENT DOCUMENTS

| EP | 2148403 A1 | 1/2010 |
|----|------------|--------|
| EP | 2405545 A1 | 1/2012 |
| FR | 2214185 A1 | 8/1974 |
| WO | WO 2011/061579 A1 | 5/2011 |

OTHER PUBLICATIONS

Written Opinion (PCT/ISA/237) mailed on Jun. 28, 2013, by the European Patent Office as the International Searching Authority for International Application No. PCT/EP2013/059850.

International Search Report (PCT/ISA/210) mailed on Jun. 28, 2013, by the European Patent Office as the International Searching Authority for International Application No. PCT/EP2013/059849.

Written Opinion (PCT/ISA/237) mailed on Jun. 28, 2013, by the European Patent Office as the International Searching Authority for International Application No. PCT/EP2013/059849.

International Search Report (PCT/ISA/210) mailed on Jun. 28, 2013, by the European Patent Office as the International Searching Authority for International Application No. PCT/EP2013/059851.

Written Opinion (PCT/ISA/237) mailed on Jun. 28, 2013, by the European Patent Office as the International Searching Authority for International Application No. PCT/EP2013/059851.

* cited by examiner

ELECTRICAL ADAPTER, AND RELATED SWITCHGEAR PANEL

RELATED APPLICATION(S)

This application is a continuation of International Application No. PCT/EP2013/059849 filed on May 13, 2013, and claims priority to European Patent Application No. 12171297.0 filed on Jun. 8, 2012, the entire content of both of which is incorporated herein by reference.

FIELD

The present disclosure relates to an electrical adapter suitable for allowing the electrical connection between the connection contacts of a circuit breaker with corresponding contact pieces of an electrical circuit along which the circuit breaker has to be electrically inserted, and to a related electrical switchgear panel using such an electrical adapter.

BACKGROUND INFORMATION

The use of switchgear panels is known in the field of electrical distribution. From a structural point of view, known switchgear panels, which can also be indicated with the equivalent terms of electric switchboards, or simply switchgear or electric panels, or similar definitions, include a metallic cubicle that is internally divided into several compartments or cells housing various apparatuses and equipment. For example, one compartment can house a switching unit, such as a circuit breaker, a second compartment can house main connections, such as bus-bars, feeding power from an electrical source, and a further compartment can house a system of cables suitable to be connected to a load, for example an electrical motor.

For example, the circuit breaker, can be the withdrawable type, when in operation is connected in input and output to corresponding contact pieces associated with a source side (for example bus.-bars) and a load side (for example other conductors or cables), respectively, of a circuit to which it is associated. For example, in case of faults occurring along the associated circuit, the circuit breaker can intervene and interrupt the flow of current.

At a certain time the installed circuit breaker, once reaching the end of its useful life, which may last several years, needs to be replaced by functionally equivalent devices. For example, such a replacement may also be temporarily needed during its working life, for example, due to maintenance interventions.

In both situations, such replacements entail some problems, either because the circuit breaker to be replaced is very old and therefore not produced any more by the original manufacturer or because the user wishes to use circuit breakers marketed by different manufacturers.

Hence, a problem of compatibility may arise between the circuit breaker to be used and the structural and/or functional characteristics of the existing switchgear panel into which the new circuit breaker has to be installed. For example, the distance between the pre-existing contact pieces of the electric circuit may be totally different and unsuitable with respect to the distance of the corresponding input and output connection contacts of the circuit breaker.

One relatively expensive solution adopted to face this issue is to replace the entire switchgear panel instead of retrofitting it by replacing only the circuit breaker.

Another solution foresees to replace the old circuit breaker with a new one modified case by case in order to customize it with the specific existing switchgear panel, or to modify the existing switchgear panel in order to adapt it to the new circuit breaker under installation.

A customized approach as described can use an extensive use of highly qualified resources and face practical problems. For example, design an ad-hoc solution can be needed for each retrofit intervention including knowing the specific dimensions and functionalities of the original circuit breaker and/or related panel, including possible variations that may affect functionality and safety.

SUMMARY

An electrical adapter suitable for connecting a connection contact of a circuit breaker with an associated contact piece of an electrical circuit along which the circuit breaker is inserted, the electrical adapter comprising: a hollow tubular element having a first end portion and a second end portion configured to be electrically connected to a connection contact and a contact piece, respectively, an inner cavity of the hollow tubular element having, at the first end portion, a first frusto-conical shape; a first connector having a hollow deformable body, the first connector being configured to be accommodated inside the first end portion having the first frusto-conical shape; a locking body configured to be securely placed along the inner cavity of the hollow tubular element; and a second connector including a first connection portion configured to be accommodated inside the first end portion having the first frusto-conical shape of the hollow tubular element, a main portion extending transversely from and outside of the hollow tubular element, and a contact portion which extends from the central portion in a direction opposite to that of the first portion and configured to be electrically connected to the connection contact of a circuit breaker, wherein the second connector is adapted to be mechanically secured to the locking body with the first connector mechanically fitted between and in contact with the first end portion having the first frusto-conical shape and the first connection portion of the second connector, and wherein a position of the contact portion is adjustable relative to the hollow tubular body.

A switchgear panel is disclosed comprising: a cabinet; a circuit breaker positioned inside the cabinet and having a plurality of connection contacts each suitable to be connected to a corresponding contact piece of an electrical circuit into which the circuit breaker is to be electrically inserted; and one or more electrical adapters, the one or more electrical adapters including: a hollow tubular element having a first end portion and a second end portion configured to be electrically connected to a connection contact and the contact piece, respectively, an inner cavity of the hollow tubular element having, at the first end portion, a first frusto-conical shape; a first connector having a hollow deformable body, the first connector being configured to be accommodated inside the first end portion having the first frusto-conical shape; a locking body configured to be securely placed along the inner cavity of the hollow tubular element; and a second connector including a first connection portion configured to be accommodated inside the first end portion having the first frusto-conical shape of the hollow tubular element, a main portion extending transversely from and outside of the hollow tubular element, and a contact portion which extends from the central portion in a direction opposite to that of the first portion and configured to be electrically connected to a connection contact of a circuit breaker, wherein the second connector is adapted to be mechanically secured to the locking body with the first connector mechanically fitted between and in contact with the first end portion having the first frusto-conical shape and the first connection portion of the second connector, and wherein a position of the contact portion is adjustable relative to the hollow tubular body; and wherein each electrical adapter electrically connects a connection contact of the circuit breaker with a corresponding contact piece of the electrical circuit.

BRIEF DESCRIPTION OF THE DRAWINGS

The subject matter of the disclosure will be explained in more detail in the following text with reference to exemplary embodiments, which are illustrated in the attached drawings, in which.

DETAILED DESCRIPTION

Figure 1:
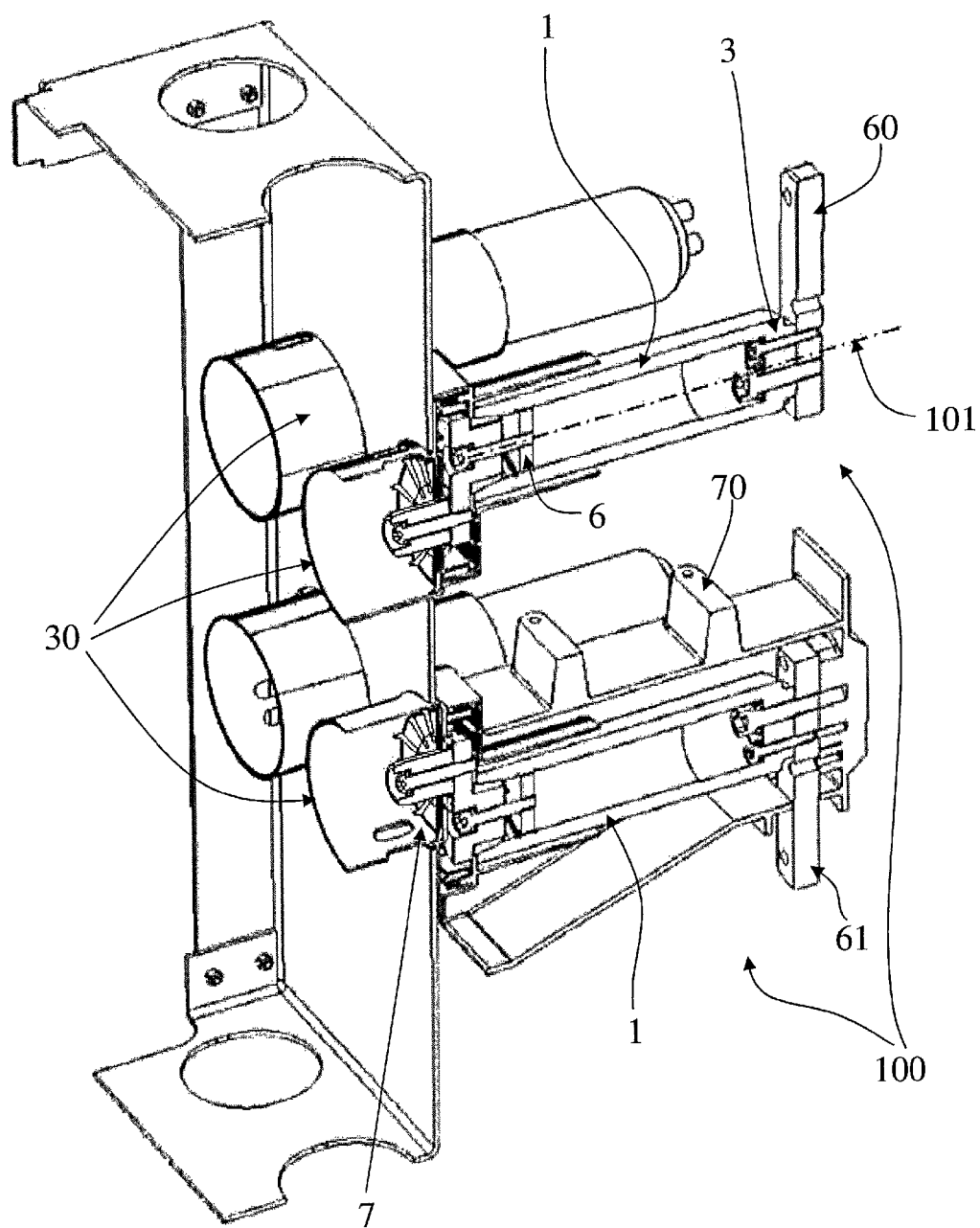
FIG. 1 is a perspective view of electrical adapters according to a first exemplary embodiment of the present disclosure, which are each electrically connected to a corresponding contact piece of an electrical circuit.

In accordance with an exemplary embodiment, an electrical adapter is disclosed suitable for connecting a connection contact of a circuit breaker with an associated contact piece of an electrical circuit along which the circuit breaker has to be inserted, which can include a hollow tubular element having a first end portion and a second end portion suitable to be electrically connected to the connection contact and the contact piece, respectively, the inner cavity of the hollow tubular element having, at the first end portion, a first frusto-conical shape. A first connector can have a hollow deformable body, the first connector being suitable to be accommodated inside the first end portion having a first frusto-conical shape. A locking body suitable to be securely placed along the inner cavity of the hollow tubular element. A second connector including a first connection portion configured to be accommodated inside the first end portion having a first frusto-conical shape of the hollow tubular element, a main portion extending transversely from and outside of the hollow tubular element, and a contact portion which extends from the central portion in a direction opposite to that of the first portion and is devised to be electrically connected to the connection contact of a circuit breaker, wherein the second connector is adapted to be mechanically secured to the locking body with the first connector mechanically fitted between and in contact with the first end portion having a first frusto-conical shape and the first connection portion of the second connector, and wherein the position of the contact portion is adjustable relative to the hollow tubular body.

It should be noted that in the detailed description that follows, identical or similar components, either from a structural and/or functional point of view, have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

Further, when the term "adapted" is used herein while referring to any component as a whole, or to any part of a component, or to a whole combinations of components, or even to any part of a combination of components, it has to be understood that it means and encompasses the structure, and/or configuration and/or shape and/or positioning of the related component or part thereof, or combinations of components or part thereof, such term refers to.

Figure 11:
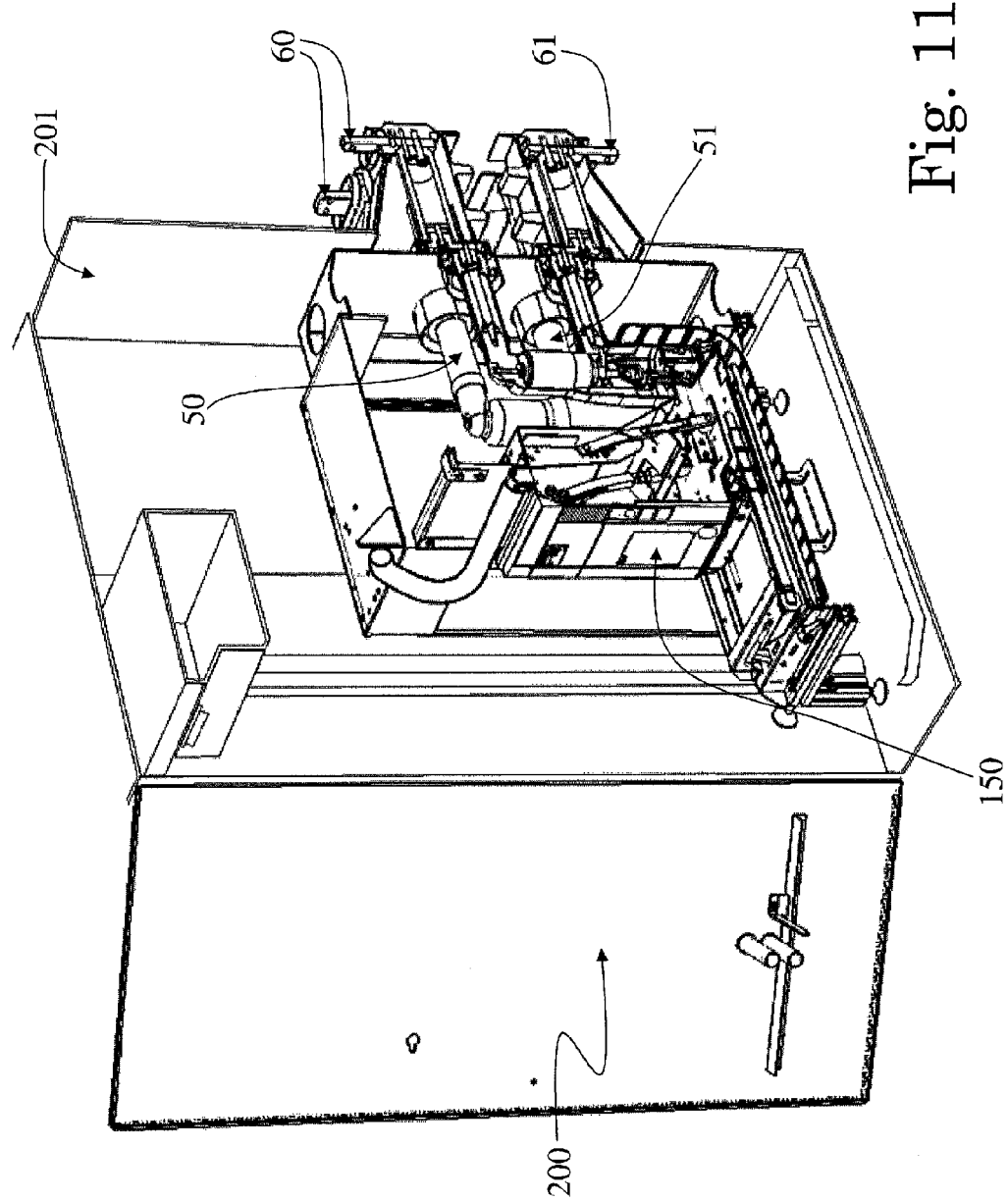
FIG. 11 is an exemplary perspective view illustrating an exemplary switchgear panel wherein a circuit breaker is electrically connected to an associated electrical circuit by using an electrical adapter according to the present disclosure.

FIG. 11 shows an example of an electric switchgear panel indicated by the overall numeral reference 200 which includes according to known solutions, a cubicle or cabinet 201 (partially removed for the sake of clarity of illustration) whose internal volume is divided into one or more compartments suitable to accommodate various electrical or electronic equipment and/or devices; for example, one compartment is devoted to house a circuit breaker, an exemplary type of which is illustrated in FIG. 11 by the reference number 150.

As known, such a circuit breaker 150 (also shown partially cut) can be devoted to be inserted along an associated electrical circuit; more in detail, the circuit breaker 150 can include for each phase a first connection contact 50 and a second connection contact 51 suitable to be connected, in input and output, to corresponding first and second contact pieces 60, 61, respectively, of the associated electrical circuit. For example, each first contact piece 60 can be electrically connected to a power source, while each second contact piece 61 can be electrically connected to a load, such as, for example, an electric motor.

In accordance with an exemplary embodiment, the electrical connection between each connection contact 50, 51 of the circuit breaker 150 and the corresponding contact piece 60, 61 of the associated electrical circuit can be realized by a dedicated electrical adapter according to the present disclosure, indicated in the attached figures by the overall reference number 100.

In the following description, the electrical adapter 100 will be described by making reference to the connection of one connection contact 50 with the associated contact piece 60 of a phase, but it has to be understood that an electrical adapter 100 according to the present disclosure can be used for each couple of connection contact 50 (or 51) associated respective contact piece 60 (or 61) of each phase.

As illustrated, the electrical adapter 100 can include a hollow tubular element 1 having a body, made for instance of aluminum and having a cylindrical shape, which can extend along a longitudinal reference axis 101. As better visible for instance in FIGS. 5 and 7 the tubular element 1 can have a first end portion 2 and a second end portion 3 suitable to be electrically connected to the connection contact 50 of the circuit breaker 150 and to the corresponding contact piece 60 of the electrical circuit, respectively.

The inner cavity 4 of the hollow tubular element 1 can have, at the first end portion 2, a first frusto-conical shape 40, for example, converging towards the reference axis 101 when moving from the external border of the first end portion 2 towards the inside of the tubular element 1. The inner cavity 4 of the hollow tubular element 1 can include also a second cylindrical-shaped portion 11.

The electrical adapter 100 according to the present disclosure can include a first connector 5 which is made for example of copper and has a hollow deformable body, for example elastically deformable, which is suitable to be accommodated, for example forcedly, inside the first frusto-conical part 40 of the first end portion 2, a locking or anchoring body 6 suitable to be securely placed, in a stable position, along the inner cavity 4 of the hollow tubular element 1, at the second cylindrical-shaped portion 11 and outside the first frusto-conical shaped portion 40, and a second connector, indicated by the overall reference number 7, which can include one or more pieces assembled together and is adapted to be mechanically secured to the locking body 6 with the first connector 5 mechanically forcedly fitted between and in contact with the first end portion 2 having a first frusto-conical shape 40 and the corresponding surfaces of the second connector 7.

In the exemplary embodiments illustrated herein, the second connector 7, which is made for example of copper can include a first connection portion 8, for example tubular, which is configured to be accommodated inside the first frusto-conical shape portion 40 of the first end portion 2, a main or central portion 9, for example link-shaped, which extends transversely (relative to the axis 101) from and outside the hollow tubular element 1, and a contact portion 10 which is suitable extends from the central portion 9 in a direction opposite to that of the first portion 8, and is devised to be electrically connected to the associated connection contact 50 of a circuit breaker 150, wherein, as it will be described in more details in the following, the position of the contact portion 10 is adjustable relative to the hollow tubular body 1.

In accordance with an exemplary embodiment, the second connector 7 can be adapted so that the position of the contact portion 10 is adjustable on a virtual plane substantially perpendicular to the reference axis 101 of the hollow tubular body 1, for example, along a circumference lying on such a plane.

In addition, the second connector 7 can be adapted so that the position of the contact portion 10 is further adjustable along a radial direction on the virtual plane perpendicular to the reference axis 101 of the hollow tubular body 1.

In the embodiments illustrated, the second connector 7 can include a first single piece forming the connection portion 8 and the main portion 9. In accordance with an exemplary embodiment, the contact portion 10 is a second separate piece mechanically connected, in a position-adjustable manner, to the main portion 9. For example, the main portion 9 can include a threaded slot or hole 26 and the contact piece 10 can includes a through channel 27, slightly larger than the threaded slot or hole 26. In this way, the contact piece 10 can be screwed onto the main portion 9, for example, by means of a screw 28, and can be slightly adjusted along the contact surface between the contact portion 10 and the main portion 9.

The first connection portion 8 and the main portion 9 of the second connector 7 can form a common through channel 160 inside which a screw 17 can be inserted.

In the embodiments illustrated, the locking body 6, which is, for example, made of brass has a substantially cylindrical shape and can include, for example at a central portion thereof, a hole 14, for instance a through hole, which is at least partially threaded.

The first connector 5 has a hollow ring-shaped body with a frusto-conical outer surface 15 and a longitudinal cut 16 which can allow the elastic deformation of the first connector 5. In accordance with an exemplary embodiment, the internal cavity of the connector 5 can have, for example, a cylindrical shape.

Figure 2:
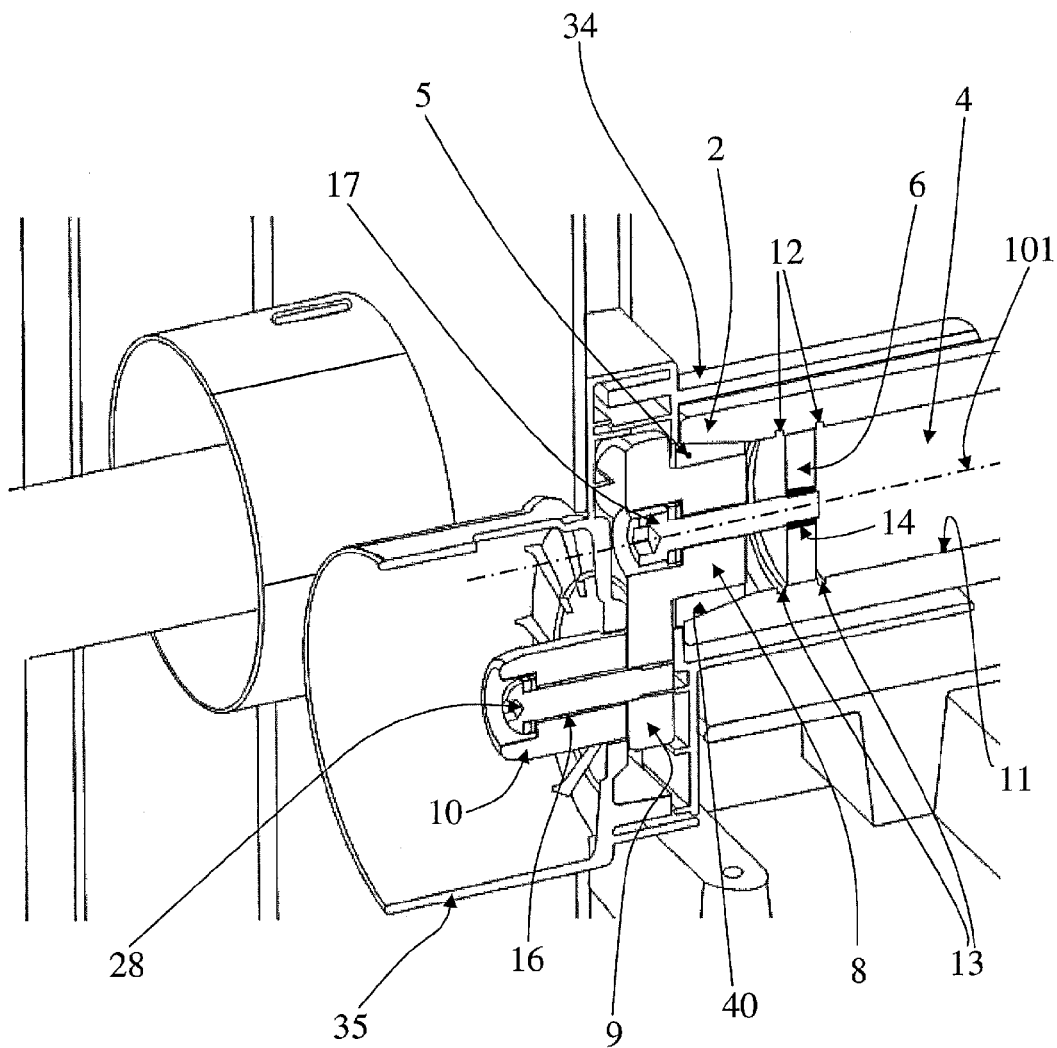
FIG. 2 is an enlarged view of a part of FIG. 1.

According to a first exemplary embodiment illustrated in FIGS. 1-2, the inner cavity 4 of the hollow tubular body 1 can have, along the second cylindrical-shaped portion 11, two annular slots 12 which are spaced from each other along the axis 101 and are suitable to accommodate each a corresponding retaining ring 13, for example, Seeger rings. In accordance with an exemplary embodiment, the locking body 6, for example, having the shape of a disc can be positioned between the two annular slots 12 and kept stable in that position by the rings 13. In accordance with an exemplary embodiment, the second end portion 3 of the hollow tubular body 1 can be adapted to be directly connected to the contact piece 60, for example, by means of screws 62.

In the second and third exemplary embodiments illustrated in FIGS. 3-5 and 6-7, respectively, the second cylindrical portion 11 of the inner cavity 4 can be at least partially threaded. Further, the inner cavity 4 can have at the second end portion 3, a second frusto-conical shaped portion 41.

In these two exemplary embodiments, in addition to the threaded hole 14, the locking body 6 can have a substantially cylindrical shape, for example, in the form of a ferrule or disc, whose outer side surface 18 can also be at least partially threaded. In accordance with an exemplary embodiment, differently from the first embodiment, the cylindrical body 6 can be screwed onto the second threaded cylindrical portion 11 of the inner cavity 4 of the hollow tubular body 1.

Further, according to these two exemplary embodiments, the electrical adapter 100 can include a third connector 20, which can be made, for example, of copper or brass and can have a hollow deformable body, for example, elastically deformable. In accordance with an exemplary embodiment, the third connector 20 can be suitable to be accommodated, for instance forcedly, inside the second frusto-conical shaped portion 41 of the second end portion 3, around a corresponding portion of the contact piece 60 and between the contact piece 60 and the second frusto-conical shaped portion 41 of the hollow tubular body 1.

Figure 3:
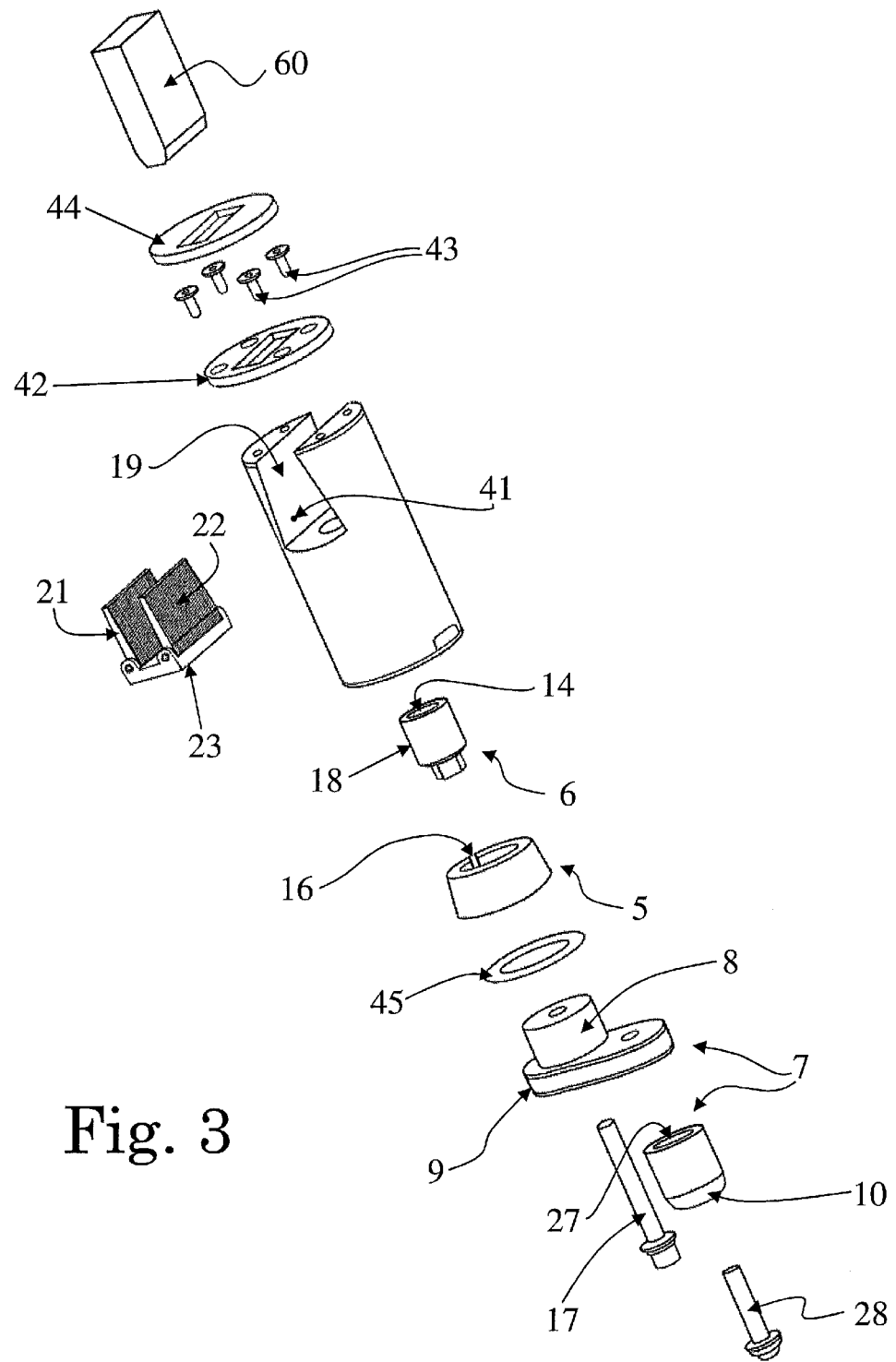
FIG. 3 illustrates components of an exemplary electrical adapter according to an exemplary embodiment of the present disclosure.
Figure 4:
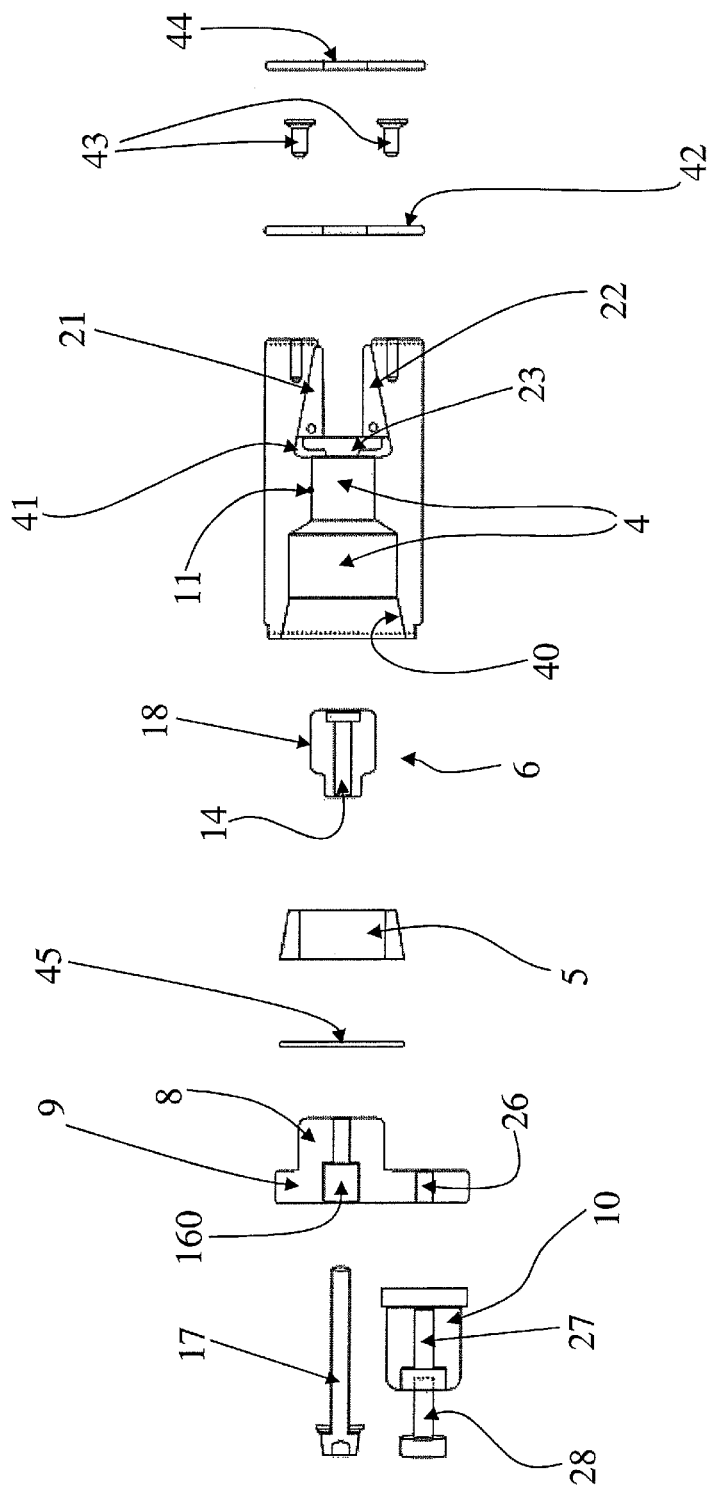
FIG. 4 illustrates components of an exemplary electrical adapter according to an exemplary embodiment of the present disclosure.
Figure 5:
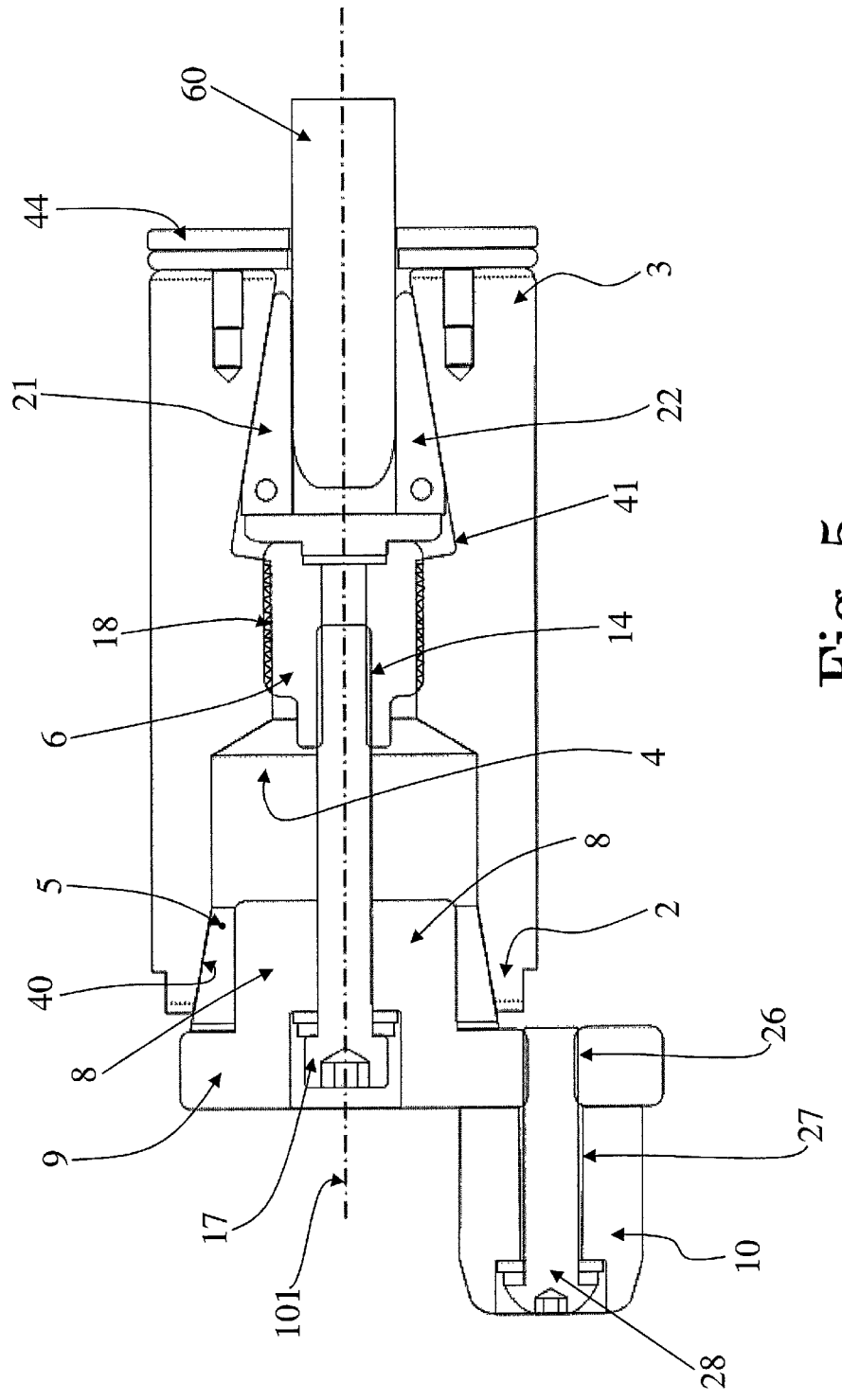
FIG. 5 is a side cross-view showing the components of FIGS. 3 and 4 assembled together and connected to a contact piece of an associated electric circuit.

In accordance with an exemplary embodiment, according to the exemplary embodiment illustrated in FIGS. 3-5, the hollow tubular body 1 can include, at the second end portion 3 with the internal second frusto-conical shape, a side opening or cut 19. For example, the third connector 20 can be accommodated inside the second end portion 3 through the side opening 19 and can include a first web-shaped portion 21, a second web-shaped portion 22, and a central portion 23 connecting, on one side, the first and second web-shaped portions 21, 22.

According to this exemplary embodiment, the second end part of the hollow tubular element 1 can be closed by a plate 42, for example, a planar disc, screwed onto the tubular element 1 by means of screws 43.

Figure 6:
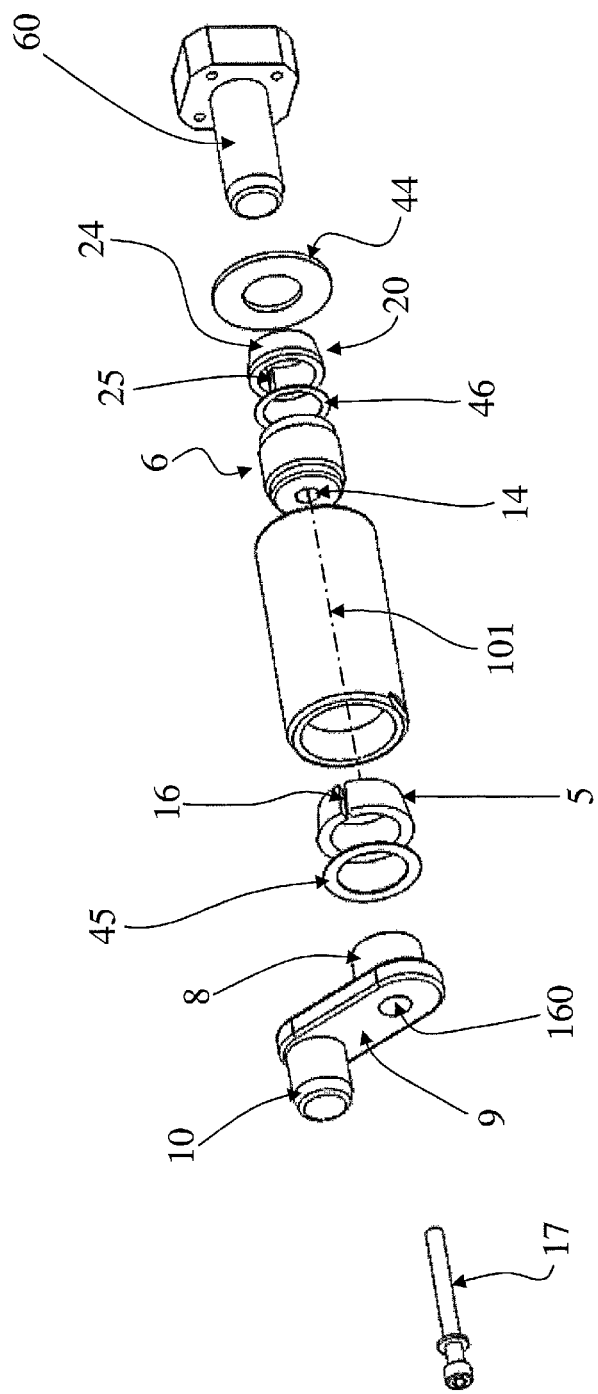
FIG. 6 is a perspective view showing components of an exemplary electrical adapter according to an exemplary embodiment of the present disclosure.
Figure 7:
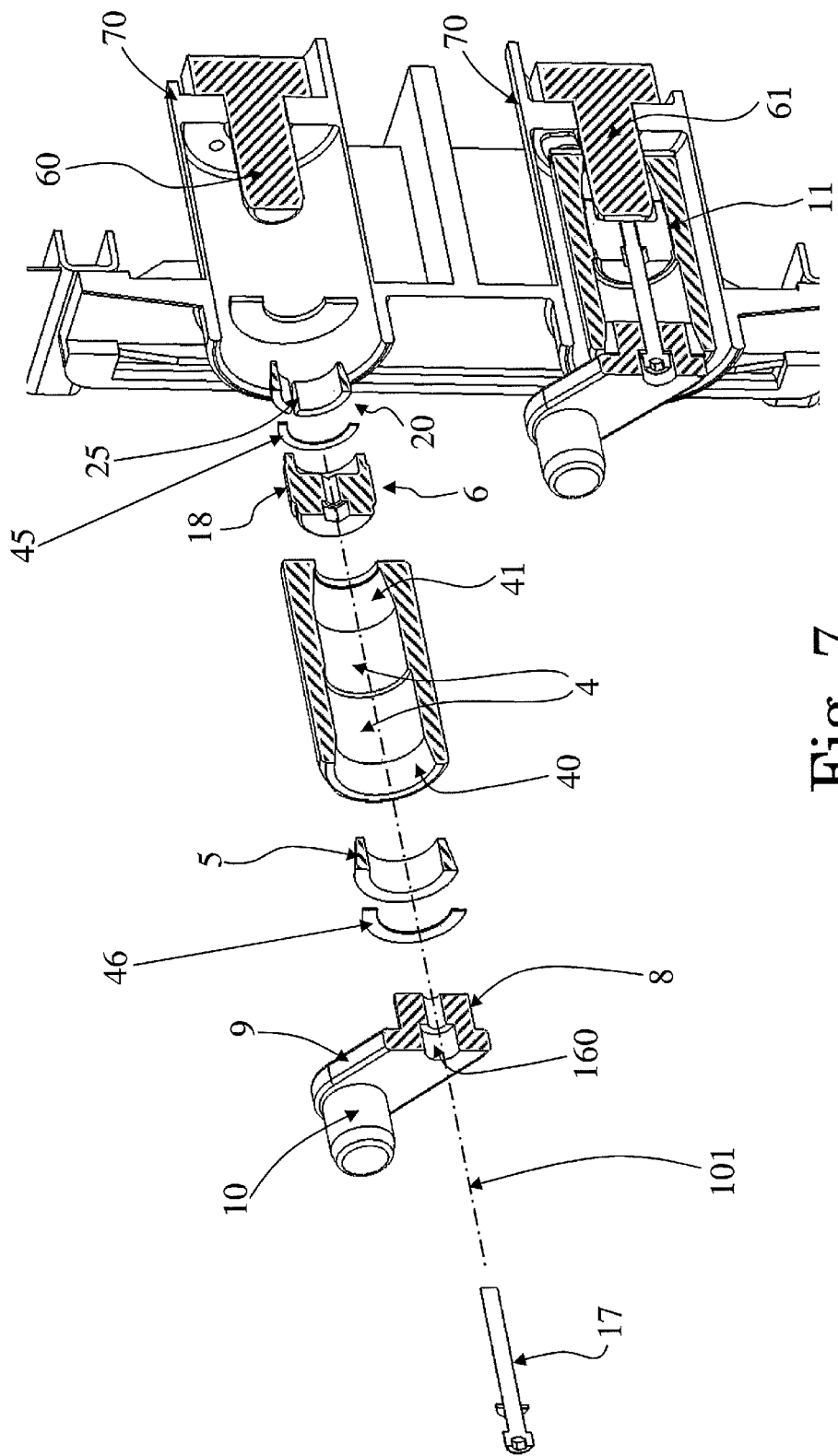
FIG. 7 is a perspective view showing a first electrical adapter and a second electrical adapter according to the exemplary embodiment of FIG. 6, wherein their relative components are illustrated (in cross-section) assembled with a contact piece and exploded, respectively.

According to the exemplary embodiment of FIGS. 6-7, the third connector 20 can have a structure similar to that of the first connector 5, for example, it can include a hollow ring-shaped body with a frusto-conical outer surface 24 and a longitudinal cut 25 which can allow the elastic deformation of the third connector 20; the internal cavity of the third connector 20 can have, for example, a cylindrical shape.

Figure 8:
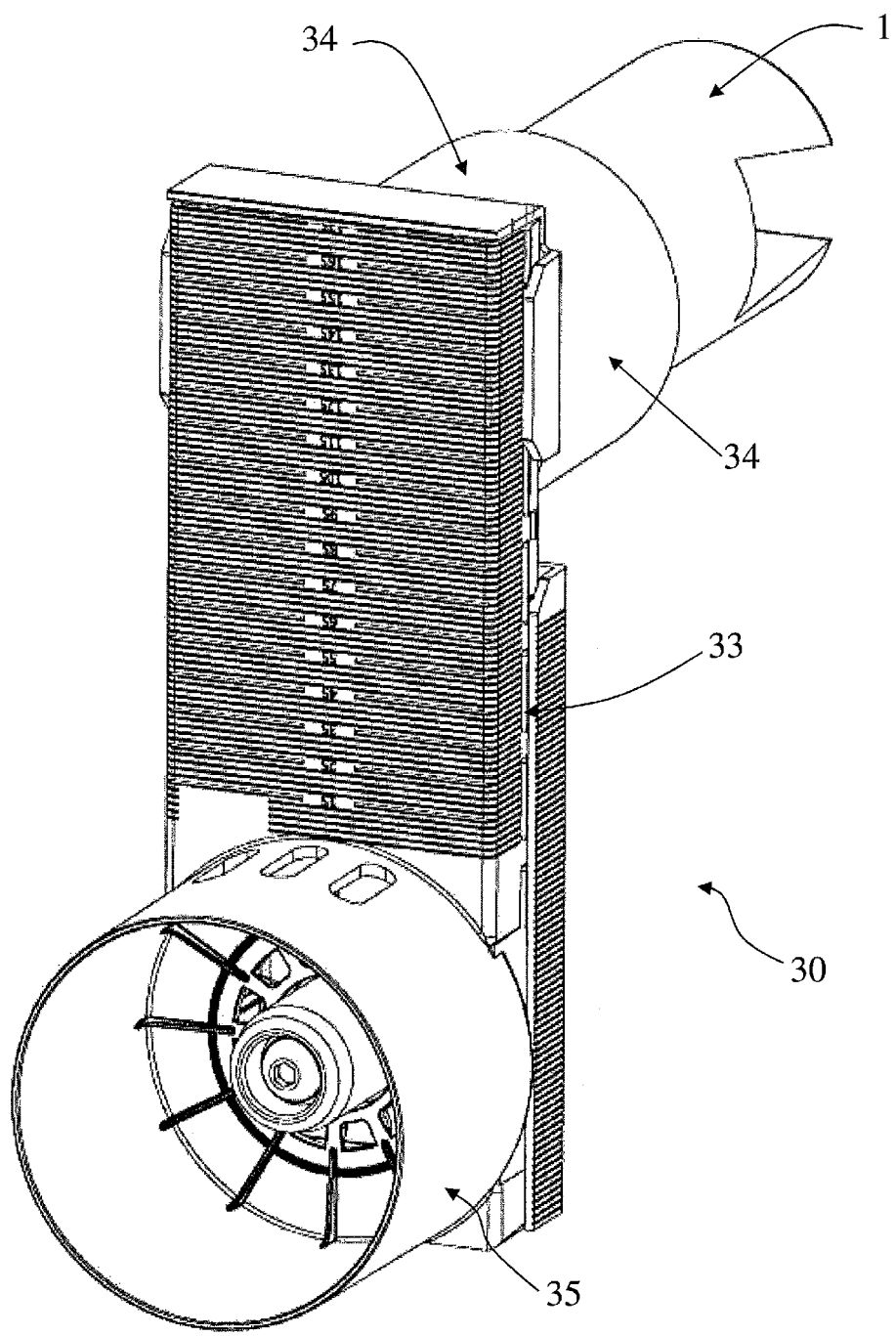
FIG. 8 is a perspective view showing an exemplary electrically insulating shell used in the electrical adapter according to the present disclosure.
Figure 9:
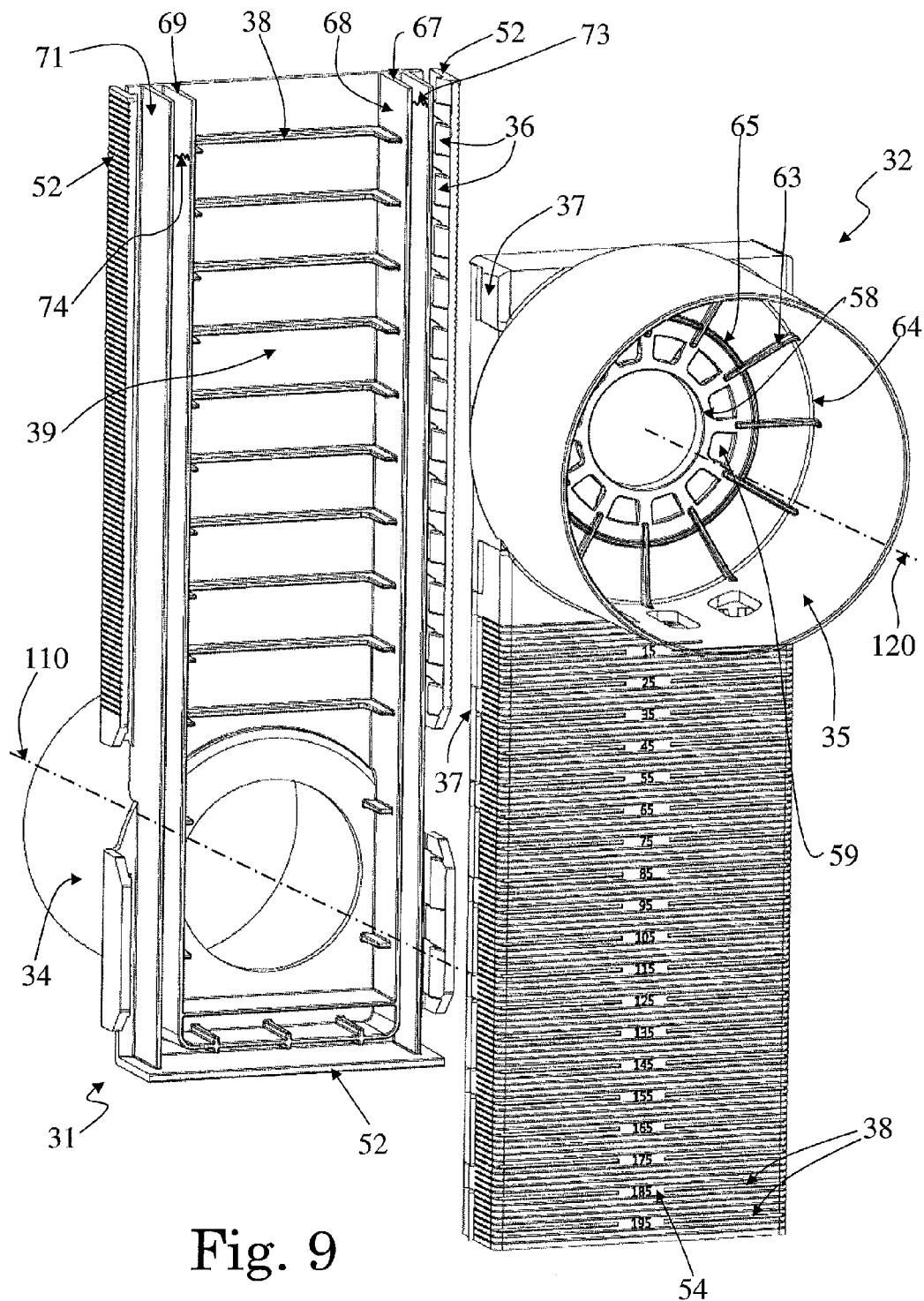
FIG. 9 illustrates components of the exemplary insulating shell of FIG. 8 disassembled and seen from different perspectives.
Figure 10:
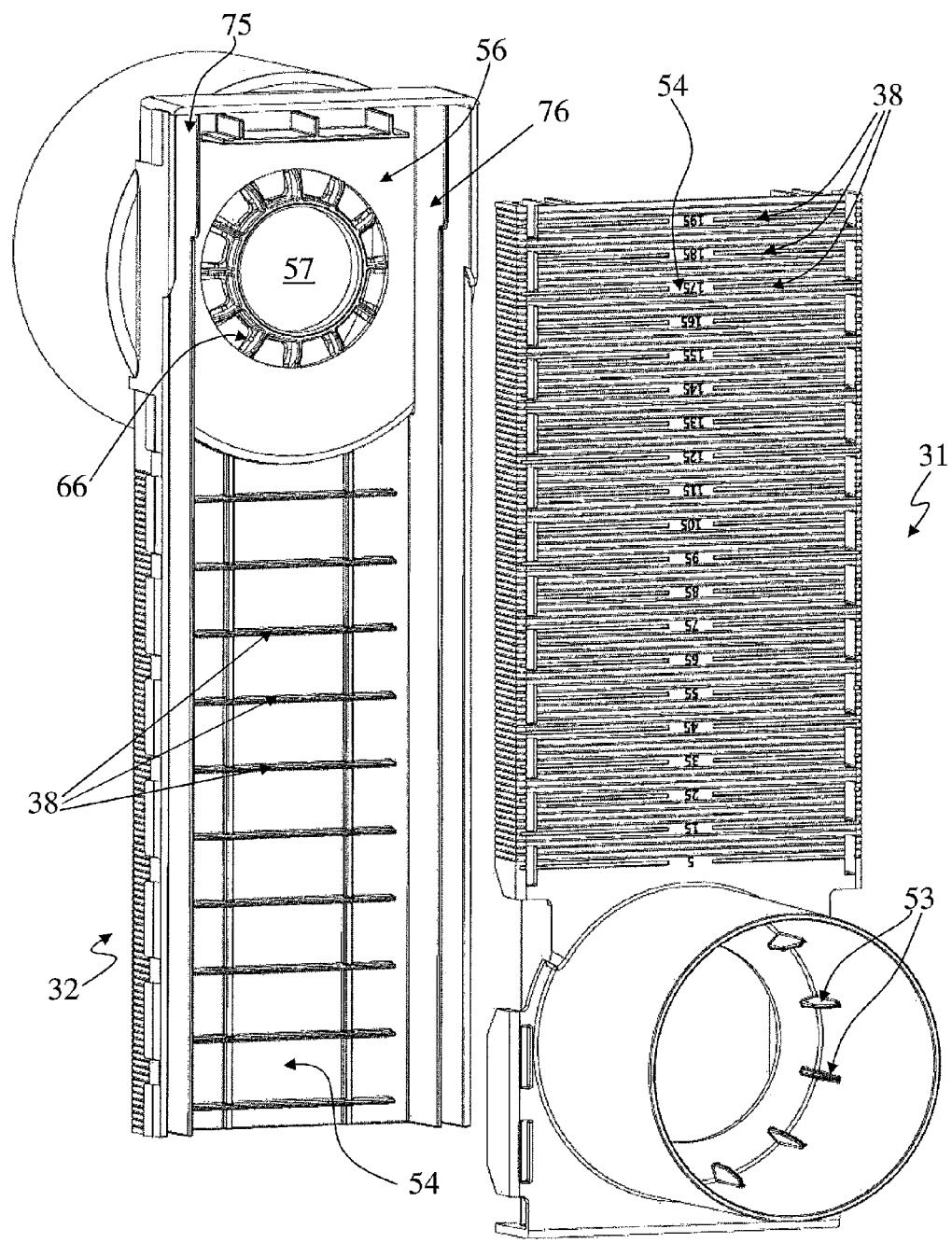
FIG. 10 illustrates components of the exemplary insulating shell of FIG. 8 disassembled and seen from different perspectives.

In accordance with exemplary embodiments, the electrical adapter 100 can include as illustrated in FIGS. 8-10, an electrical insulating shell 30 which can include a first half shell 31 and a second half shell 32 devised to be mutually connected together and shaped so as to define, once connected together (see FIG. 8), a central part 33 delimiting a substantially closed space encasing inside it the main portion 9 of the second connector 7, and a first hollow portion 34 protruding transversely from a first side of the central part 33, for instance at an end portion thereof. The cavity of the first hollow portion 34 can be in space communication or continuity with the inner space of the closed central part 33 and can be adapted to be placed around and operatively connected to the first end portion 2 of the hollow tubular body 1. The two shells 31 and 32 once connected define also and a second hollow portion 35 which protrudes transversely from a second side of the central part 33 opposite to the first side, for example and as illustrated in the figures, the second hollow portion 35 can be located at a second end of the central part 33 opposite to its first end where the first hollow portion 34 is provided. The cavity of the second hollow portion 35 can also be in space communication or continuity with the inner space of the closed central part 33 and can be adapted to surround the contact portion 10 of the second connector 7.

In accordance with an exemplary embodiment, the insulating shell 30 can define a continuous path (formed by the cavity of the first hollow portion 34, the inner space encased by the central part 33 which has the form of a box-like element, and the cavity of the second hollow portion 35) along and inside which a part of the conductive path can be placed and electrically insulated from the surrounding environment.

In accordance with an exemplary embodiment, at least one of the first half shell 31 and the second half shell 32, for example, both, can include a shaped body having a plurality of reference notches 38 adapted to allow cutting away portions of the respective shaped body; in this way, the insulating shell 30 as a whole, can have a substantially modular and scalable size. For example, the size of the insulating shell 30 can be adjusted, and for example, the central part 33 of the insulating shell 30 according to specific applications.

In accordance with an exemplary embodiment, the first half shell 31 and the second half shell 32 can include first coupling means 36 and second coupling means 37, respectively, which can be suitable to mutually engage so as to mechanically connect each other the first half shell 31 and the second half shell 32 in a snap-fit way.

In accordance with an exemplary embodiment, as illustrated in FIGS. 9 and 10, the first half shell 31 can include a shaped body having a first base wall 39, one or more first side walls 52 which protrude transversely from the first base wall 39, and a first hollow tubular portion 34 which is made integral with and protrudes, for example, perpendicularly, from the first base wall 39, along a reference axis 110, in a direction opposite from that of the one or more first side walls 52, the first hollow tubular portion 34, in the exemplary embodiment illustrated, forms the first hollow portion of the insulating shell 30.

In accordance with an exemplary embodiment, the first coupling means 36 can include one or more teeth 36 provided on at least one of the one or more first side walls 52. In accordance with an exemplary embodiment, a plurality of teeth 36 is provided on both the two vertical side walls 52.

In accordance with an exemplary embodiment, a first plurality of reference notches 38 can be provided at least along the first base wall 39 and can be adapted to allow cutting away portions of its shaped body so as to adjust the size, and for example, the length of the first half shell 31 measured along a direction perpendicular to the extension (for example, the reference axis 110) of the first hollow tubular portion 34.

As illustrated, such notches 38 are indexed with reference tags ("195, "185" etc.) which give an immediate visual indication to a user of the relative length quote of the first base wall 39.

Further, the illustrated first half shell 31 can be provided with a first plurality of centering fins 53, which can be provided on the inner surface of the first hollow tubular portion 34. In accordance with an exemplary embodiment, such fins 53 can be devised to allow a correct position and centering of the piece of conductor, which may be inserted in and coupled with the first hollow tubular portion, such as the hollow tubular element 1 as illustrated in FIG. 8.

In accordance with an exemplary embodiment, the second half shell 32 can include a shaped body having a second base wall 54, one or more second side walls 55 which protrude transversally from the second base wall 54, and a second hollow tubular portion 35 which is made integral with and protrudes perpendicularly from the second base wall 54 along a reference axis 120, in a direction opposite from that of the one or more second side walls 55, In accordance with an exemplary embodiment, the second hollow tubular portion 35, in the exemplary embodiment illustrated, can form the second hollow portion 35 of the insulating shell 30.

The second coupling means 37 can include one or more hooks 37, which can be suitable to engage each with a corresponding tooth 36 and are provided on at least one of the one or more second side walls 55. In an exemplary embodiment illustrated, a plurality of hooks 37 can be provided on both the two vertical side walls 55.

In accordance with an exemplary embodiment, the second hollow tubular portion 35 of the second half shell 32 can include, at the second base wall 54, a bottom wall 56 having a central part with a main hole 57 surrounded by a contour ring 58. The bottom wall 56 can be part of or additional to the second base wall 54.

In accordance with an exemplary embodiment, a plurality of secondary holes 59 can be provided circumferentially around the central main hole 57 on the outer part of the contour ring 58. A plurality of lugs 63 can run between the external rim 64 of the plurality of secondary holes 59 and a notch 65 is provided, for example, circumferentially at the external border of the central part. The notch 65 allows cutting away, when needed, the central part of the bottom wall including the main hole 57, the contour rim 58, the secondary holes 59 and the plurality of lugs 63. In the exemplary embodiment illustrated, there are also additional notches 66 associated with corresponding lugs 63.

In accordance with an exemplary embodiment, for example it can be possible to have a larger hole for the second hollow portion 35, and therefore easily adapt the insulating shell 30 to a part of conductor having a bigger size.

In the exemplary embodiment illustrated, likewise the first shell 31, also the second half shell 32 can include a plurality of reference notches 38 which are provided at least along the second base wall 52 and can be adapted to allow cutting away portions of its shaped body so as to adjust the size, and for example, the length of the second half shell 32 measured along a direction perpendicular to the extension (for example, the second reference axis 120) of the second hollow tubular portion 35.

Also the notches 38 provided on the second half shell 32 are indexed with reference tags ("195, "185" etc.) which give an immediate visual indication to a user of the relative length quote of the second base wall 54.

As illustrated, the first half shell 31 can include a first insulating barrier 67, a second insulating barrier 68, a third insulating barrier 69, and a fourth insulating barrier 71 which all extend from one side of the first base wall 39 substantially parallel to each other and to the vertical first side walls 52; for example, the first and second insulating barriers 67, 68 can be positioned close to each other and spaced apart from each other of a first space 73, while the third and fourth insulating barriers 69, 71 can be positioned close to each other and spaced apart from each other of a second space 74.

In accordance with an exemplary embodiment, the second half shell 32 can include a fifth insulating barrier 75 and a sixth insulating barrier 76, which extend from one side of the second base wall 54 substantially parallel to each other and to the second vertical side walls 55.

The fifth insulating barrier 75 and the sixth insulating barrier 76 can be adapted to enter the first space 73 and the second space 74, respectively, when the first and second half shells 31, 32 are mutually connected.

In accordance with an exemplary embodiment, a geometrical labyrinth can be created at the central part 33, thus contributing to improve the electrical insulation.

In accordance with an exemplary embodiment, when the electric adapter 100 has to be installed for connecting electrically a connection contact 50 of a circuit breaker 150 to an associated pre-installed contact piece 60 of an electrical circuit, the hollow tubular element 1 is first positioned, usually inside a pre-mounted insulator 70 illustrated only in FIGS. 1 and 7.

Then, in the embodiment of FIGS. 1-3 the hollow tubular element is directly connected, for example, screwed, onto the respective contact piece 60 or 61. In accordance with an exemplary embodiment, the locking body 6 can be inserted inside the cavity 4 and can be substantially locked in position between the two retaining rings 13. Then the first half shell 31 can be positioned with the first hollow portion 34 fitted around the first end portion 2 of the hollow tubular element 1. The first connector element 5 can be positioned inside the first frusto-conical shaped portion 40 of the cavity 4 followed by the placement of the second connector 7 with the first connection portion 8 inserted inside the first connector 5. Then, the second connector 7 can be loosely screwed onto the locking body 6 by using a screw 17, which passes through the common channel 160. In this way, the second connector 7 can be moved, for example, rotated around the axis 101 (or an axis parallel to), to bring the contact portion 10 in the desired position. Such position adjustment can be executed by using, for example, one or more dimes to position the contact portion 10, relative to the hollow tubular element 1, at a location where the connection contact 50 will arrive when the circuit breaker 150 is inserted in operation. Once the contact portion 10 is in the desired position, the screw 17 can be screwed firmly inside the threaded hole 14 of the locking body 6. In accordance with an exemplary embodiment, while screwing the screw 17, the connection portion 8 can be pushed inside the first frusto-conical shape 40 of the first end portion 2 and can mechanically fit the first connector 5 between the first connection portion 8 and the first end portion 2 having a first frusto-conical shape 40 with the first connector 5 mechanically and firmly constrained there between. Finally, as illustrated, for example, in FIGS. 1-2, for the sake of simplicity, the second half shell 32 can be snap-fitted with the first half shell 31 so as the contact portion 10 is inside the tubular portion 35 and in the correct position ready to be connected to the corresponding connection contact 50 of the circuit breaker as, for example, illustrated in FIG. 11.

In accordance with exemplary embodiments shown in FIGS. 3-5 and 6-7, the hollow tubular element 1 can be positioned (for example inside the insulator 70) with a portion of the contact piece 60 (or 61) inserted inside it. Then according to the embodiment of FIGS. 3-5, the third connector 20 can be positioned inside the second frusto-conical shaped portion 41 through the side cut 19. In the exemplary embodiment of FIGS. 6-7 instead, the third connector 20 can be inserted into the second frusto-conical shaped portion 41 passing from the first frusto-conical shaped portion 40 and the second cylindrical portion 11. Then the locking element 6 can be inserted inside the cylindrical portion 11 with its outer threaded surface 18, which is screwed onto the corresponding threaded surface of the inner cylindrical portion 11. In this way, while being screwed, the locking body 6 pushes (in both embodiments) the third connector 20 towards the surface of the contact piece 60 until the third connector 20 is mechanically fitted, and substantially stably constrained between the contact piece 60 (or 61) and the inner surface of the second frusto-conical shaped portion 41.

Assembling of the first connector 5, the second connector 7, and of the insulating shell 30 is then executed substantially exactly as previously described for the first exemplary embodiment of FIGS. 1-3.

In accordance with an exemplary embodiment, it has been found that the electrical adapter 100 according to the present disclosure gives some significant improvements over known prior art according to a flexible solution, which can be simple and mechanical sturdy. For example, the electrical adapter 100 can provide a compact and adaptable solution, for example, for different types of contact pieces, for example, screwed (see FIGS. 1 and 2), flat (see FIGS. 3-5), or rounded (see FIGS. 6-7) components. In addition, the electrical adapter 100 can be standardized and produced in series, and minor size modifications can be made in order to be used.

In accordance with an exemplary embodiment, the electrical adapter 100 can be adjustable at the circuit breaker side, and, for example, when several adapters 100 are used altogether, can form an interface which can reproduce the distance between the connection contacts of each phase of a circuit breaker, as well as the pitch or distance between two adjacent connection contacts belonging to two different phases. In accordance with an exemplary embodiment, a switchgear panel can be retrofitted with a new, standard and non-modified circuit breaker, and without any modification to the switchgear panel, for example, of the pre-existing contact pieces of the circuit into which the circuit breaker has to be electrically inserted, which can help enable also to use all standard accessories (motorization, interlocks, etc.), of the newly introduced circuit breaker with a retrofitting operation which results to be faster and cheaper since it reduces the level of expertise needed for retrofit interventions, and with an increased safety even if a low knowledge of the original panel and circuit breaker is available.

In accordance with an exemplary embodiment, the electrical adapter 100 according to the present disclosure can be used for retrofitting, for example, any type of switchgear panel with preinstalled contact pieces 60, 61 whose mutual distance of the same phase and/or between adjacent phases cannot be substantially changed and therefore the electrical connection needs to be adapted to a new circuit breaker whose connection contacts have a respective pre-defined distance, either between the two input and output contacts of a phase, and between adjacent connection contacts of different phases (pitch distance).

In accordance with an exemplary embodiment, the present disclosure also relates to a switchgear panel 200, which can include a cabinet, a circuit breaker 150 positioned inside the cabinet and having a plurality of connection contacts 50, 51 suitable to be connected each to a corresponding contact piece 60, 61 of an electrical circuit into which the circuit breaker has to be electrically inserted, wherein it can include one or more electrical adapters 100 as disclosed and defined in the appended claims, each electrical adapter 100 electrically connecting a connection contact 50 of the circuit breaker with a corresponding contact piece 60 of the electrical circuit.

The electrical adapter thus conceived is susceptible of modifications and variations, all of which are within the scope of the inventive concept including any combination of the above described embodiments which have to be considered as encompassed by the above description; all details may further be replaced with other technically equivalent elements. For example, the adapter 100 can have a different number of components assembled together or the components may be differently shaped provided they are suitable for the scope they were conceived; for instance, in the various embodiment a spacer 44 can used between the external part of the second end portion 3 of the hollow tubular element 1 and a corresponding portion of the associated contact piece 60; or an anti-friction ring 45 (see FIGS. 3, 6-7) can be positioned between the second connector 7 and the first connector 5, and/or a further anti-friction ring 46 (see FIGS. 3, 6-7) can be positioned between the locking body 6 and the third connector 20 when used; or the first portion 8 of the second connector 7 can be a separate piece connected to the main portion 9, for example by means of screwing, or the entire second connector can be realized in one piece. In accordance with an exemplary embodiment, the materials, so long as they are compatible with the specific use, as well as the individual components, may be any according to the specifications and the state of the art.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An electrical adapter suitable for connecting a connection contact of a circuit breaker with an associated contact piece of an electrical circuit along which the circuit breaker is inserted, the electrical adapter comprising:
    a hollow tubular element having a first end portion and a second end portion configured to be electrically connected to a connection contact and a contact piece, respectively, an inner cavity of the hollow tubular element having, at the first end portion, a first frusto-conical shape;
    a first connector having a hollow deformable body, the first connector being configured to be accommodated inside the first end portion having the first frusto-conical shape;
    a locking body configured to be securely placed along the inner cavity of the hollow tubular element; and
    a second connector including a first connection portion configured to be accommodated inside the first end portion having the first frusto-conical shape of the hollow tubular element, a main portion extending transversely from and outside of the hollow tubular element, and a contact portion which extends from a central portion in a direction opposite to that of the first portion and configured to be electrically connected to the connection contact of a circuit breaker, wherein the second connector is adapted to be mechanically secured to the locking body with the first connector mechanically fitted between and in contact with the first end portion having the first frusto-conical shape and the first connection portion of the second connector, and wherein a position of the contact portion is adjustable relative to the hollow tubular body.

2. The electrical adapter according to claim 1, wherein the second connector is adapted so that the position of the contact portion is adjustable along a circumference lying on a plane perpendicular to an axis of the hollow tubular body.

3. The electrical adapter according to claim 2, wherein the second connector is adapted so that the position of the contact portion is adjustable along a radial direction on the plane perpendicular to the axis of the hollow tubular body.

4. The electrical adapter according to claim 1, wherein the locking body has a cylindrical shape and includes a hole which is at least partially threaded.

5. The electrical adapter according to claim 1, wherein the first connector is ring-shaped and has a frusto-conical outer surface and a longitudinal cut.

6. The electrical adapter according to claim 4, wherein the first connection portion and the main portion of the second connector have a common through channel inside for receiving a screw suitable to be screwed onto the threaded hole of the locking body.

7. The electrical adapter according to claim 1, wherein the contact portion of the second connector is a separate piece mechanically connected, in a position-adjustable manner, to the main portion.

8. The electrical adapter according to claim 1, wherein the hollow tubular body has an inner cavity having a second cylindrical-shaped portion, which includes two annular slots spaced from each other and suitable to accommodate a corresponding retaining ring, the locking body being positioned between the two annular slots.

9. The electrical adapter according to claim 1, wherein the second end portion of the hollow tubular body is adapted to be directly connected to the contact piece.

10. The electrical adapter according to claim 1, wherein the hollow tubular body has an inner cavity having a second cylindrical portion which is at least partially threaded, and a second end portion having a second frusto-conical shape.

11. The electrical adapter according to claim 10, wherein the locking body has a cylindrical shape whose outer side surface is at least partially threaded so as to be screwed onto the second threaded cylindrical portion of the hollow tubular body.

12. The electrical adapter according to claim 10, comprising:
a third connector having a hollow deformable body, the third connector being suitable to be accommodated into the second end portion having the second frusto-conical shape around a corresponding portion of the contact piece and between the third connector and the second end portion of the hollow tubular body.

13. The electrical adapter according to claim 12, wherein the hollow tubular body comprises:
at the second end portion, a side opening, and wherein the third connector is accommodated inside the second end portion through the side opening and includes a first web-shaped portion, a second web-shaped portion, and a central portion connecting, on one side, the first and second web-shaped portions.

14. The electrical adapter according to claim 12, wherein the third connector is ring-shaped and has a frusto-conical outer surface and a longitudinal cut.

15. The electrical adapter according to claim 1, comprising:
an electrical insulating shell including a first half shell and a second half shell mutually connected together and shaped so as to define, once connected together, a central part delimiting a substantially closed space which will encase the main portion of the second connector, a first hollow portion for protruding from a first side of the central part, such that the first hollow portion will be in communication with the closed space of the central part and adapted to be placed around and operatively connected to the first end portion of the hollow tubular body, and a second hollow portion for protruding from a second side of the central part opposite to the first side, such that the second hollow portion will be in communication with the closed space of the central part and adapted to surround the contact portion of the second connector.

16. The electrical adapter according to claim 15 wherein at least one of the first half shell and second half shell comprises:
a shaped body having a plurality of reference notches adapted to allow cutting away portions of the shaped body.

17. The electrical adapter according to claim 15, wherein the first half shell and the second half shell comprise:
first coupling means and second coupling means, respectively, which are suitable to mutually engage so as to mechanically connect each other the first half shell and the second half shell in a snap-fit way.

18. The electrical adapter according to claim 15, wherein the second hollow tubular portion comprises:
a bottom wall having a central part including a main hole, and the bottom wall including one or more notches configured to allow cutting away the central part including the main hole.

19. A switchgear panel comprising:
a cabinet;
a circuit breaker positioned inside the cabinet and having a plurality of connection contacts each suitable to be connected to a corresponding contact piece of an electrical circuit into which the circuit breaker is to be electrically inserted; and
one or more electrical adapters, the one or more electrical adapters including:
a hollow tubular element having a first end portion and a second end portion configured to be electrically connected to a connection contact and the contact piece, respectively, an inner cavity of the hollow tubular element having, at the first end portion, a first frusto-conical shape;
a first connector having a hollow deformable body, the first connector being configured to be accommodated inside the first end portion having the first frusto-conical shape;
a locking body configured to be securely placed along the inner cavity of the hollow tubular element; and
a second connector including a first connection portion configured to be accommodated inside the first end portion having the first frusto-conical shape of the hollow tubular element, a main portion extending transversely from and outside of the hollow tubular element, and a contact portion which extends from a central portion in a direction opposite to that of the first portion and configured to be electrically connected to a connection contact of a circuit breaker, wherein the second connector is adapted to be mechanically secured to the locking body with the first connector mechanically fitted between and in contact with the first end portion having the first frusto-conical shape and the first connection portion of the second connector, and wherein a position of the contact portion is adjustable relative to the hollow tubular body; and
wherein each electrical adapter electrically connects a connection contact of the circuit breaker with a corresponding contact piece of the electrical circuit.

20. The switchgear panel of claim 19, wherein the second connector is adapted so that the position of the contact portion is adjustable along a circumference lying on a plane perpendicular to an axis of the hollow tubular body; and
the second connector is adapted so that the position of the contact portion is adjustable along a radial direction on the plane perpendicular to the axis of the hollow tubular body.

* * * * *